US012667522B2

(12) United States Patent
Bakarich et al.

(10) Patent No.: US 12,667,522 B2
(45) Date of Patent: Jun. 30, 2026

(54) DISPENSER

(71) Applicant: DOSE SAFE PTY LTD, Newcastle (AU)

(72) Inventors: Nick Bakarich, Newcastle (AU); Kurt Strassmeir, Newcastle (AU); Alexander Stewart Richardson, Belrose (AU); Matthew Webster, Belrose (AU)

(73) Assignee: DOSE SAFE PTY LTD, Newcastle (AU)

(*) Notice: Subject to any disclaimer, the term of this patent is extended or adjusted under 35 U.S.C. 154(b) by 640 days.

(21) Appl. No.: 17/915,754

(22) PCT Filed: Mar. 30, 2021

(86) PCT No.: PCT/AU2021/050283
§ 371 (c)(1),
(2) Date: Sep. 29, 2022

(87) PCT Pub. No.: WO2021/195699
PCT Pub. Date: Oct. 7, 2021

(65) Prior Publication Data

US 2023/0126675 A1 Apr. 27, 2023

(30) Foreign Application Priority Data

Mar. 30, 2020 (AU) ................................ 2020900962

(51) Int. Cl.
*A61J 7/04* (2006.01)
*B65D 55/14* (2006.01)

(52) U.S. Cl.
CPC ............ *A61J 7/0445* (2015.05); *B65D 55/14* (2013.01); *B65D 2555/02* (2013.01)

(58) Field of Classification Search
CPC ....... A61J 7/0445; B65D 41/06; B65D 55/14; B65D 83/0409; B65D 83/0454; B65D 2555/02
See application file for complete search history.

(56) References Cited

U.S. PATENT DOCUMENTS 2,565,585 A 8/1951 Barttro
2,757,008 A 7/1956 Lane
(Continued)

FOREIGN PATENT DOCUMENTS

WO 2021165412 A2 8/2021

OTHER PUBLICATIONS

Extended European Search Report in corresponding Australian Application No. 21779271.2-1113 / 4125773 PCT/AU2021/1050283 dated Feb. 23, 2024.
(Continued)

*Primary Examiner* — Gene O Crawford
*Assistant Examiner* — Kelvin L Randall, Jr.
(74) *Attorney, Agent, or Firm* — Thomas Joseph; OGC Law, LLC

(57) ABSTRACT

A dispenser (10) including a base (12) having a plurality of compartments (16) to hold product. The dispenser (10) further includes a lid (14) operatively associated with the base (12) and adapted to be pivotally secured to the base (12). The lid (14) includes a lid opening (24) which is adapted to be aligned with a single compartment (16) of the base (12) upon rotation of the lid (14) so that a user can access product held within the single compartment (16). The dispenser (10) includes aa sub-lid assembly (38) operatively adapted to control pivotal movement of the lid (14) relative to the base (12) thus controlling access to the compartments (16).

16 Claims, 10 Drawing Sheets

(56) References Cited

U.S. PATENT DOCUMENTS

| | | | | |
|---|---|---|---|---|
| 3,945,654 | A | 3/1976 | McMullen | |
| 3,999,681 | A * | 12/1976 | Graef | G07G 1/0027 221/9 |
| 5,322,166 | A * | 6/1994 | Crowther | B65D 83/0454 221/277 |
| 5,551,941 | A * | 9/1996 | Howell | B04B 5/0414 221/89 |
| 5,582,323 | A * | 12/1996 | Kurtenbach | A61J 7/0481 221/82 |
| 6,145,697 | A * | 11/2000 | Gudish | A61J 7/0481 221/3 |
| 11,679,063 | B1 * | 6/2023 | Butaud | A61J 7/0481 221/1 |
| 2004/0070287 | A1 * | 4/2004 | Corbett, Jr. | H02K 29/03 310/12.01 |
| 2005/0178779 | A1 * | 8/2005 | Wood | A61J 7/0076 221/7 |
| 2005/0205595 | A1 * | 9/2005 | Lepke | G07F 11/54 221/87 |
| 2005/0258066 | A1 | 11/2005 | Conley | |
| 2008/0048404 | A1 | 2/2008 | Korson | |
| 2012/0160863 | A1 * | 6/2012 | Thompson | B65D 50/046 221/8 |
| 2014/0035241 | A1 | 2/2014 | Borysiak | |
| 2015/0278479 | A1 | 10/2015 | Ervin | |
| 2019/0365607 | A1 * | 12/2019 | Kugler | G16H 40/20 |
| 2020/0121560 | A1 * | 4/2020 | Thomas | B65D 83/0454 |
| 2020/0261319 | A1 * | 8/2020 | Hines | A61J 7/049 |

OTHER PUBLICATIONS

International Search Report issued in relation to PCT/AU2021/050283.

International-type search for provisional patent application issed by IP Australia on Jul. 16, 2020.

International Search Report (ISR) which issued on PCT/AU2021/050298 dated May 28, 2021.

* cited by examiner

DISPENSER

CROSS REFERENCE TO RELATED APPLICATIONS

The present application is a U.S. national stage application of PCT International Application No. PCT/AU2021/050283, filed Mar. 30, 2021, and published as PCT Publication WO/2021/195699 on Oct. 7, 2021, which claims priority to Australian Application No. AU 2020900962, filed on Mar. 30, 2020. The disclosures of all the foregoing applications are hereby incorporated by reference in their entirety into the present application.

FIELD

The present invention relates to a dispenser. In one non-exclusive aspect the invention concerns a pharmaceutical dispenser for use by a patient to dispense a daily amount of medication.

BACKGROUND

Medications particularly those associated with addiction are commonly given via staged supply for up to a week. The concept of harm minimisation is key in limiting the amount of medication a person has access to at any one time thus preventing medication misadventure and polypharmacy.

Take away doses as part of this regime are doses that must be placed into individual containers that are labelled. One method by which these medications are provided to a patient includes a plastic safe having six compartments each for housing medication for six of the seven days of a calendar week. The safe has a lid which is manually actuated by the patient to access the medication in a specific compartment. The safe further includes a locking system to prevent a patient from accessing more than a single day's medication. To this effect the locking system includes a timer which enables a user to actuate the safe once a day in order to access the medication for that day. When the medication in each of the compartments has been exhausted at the end of a six-day period, corresponding to the six compartments, a user can present the safe at a pharmacy where the six compartments are replenished with medication for six days.

Certain problems have been identified in known safes used for dispensing medication. One significant issue which has occurred in certain instances is that a patient is able to remove the lid of the safe at the end of the six-day period to gain access to the locking system and tamper therewith. It has also been the case that the locking system of known safes have become defective and that the medication could only be retrieved from the safe by a suitably skilled person located offsite from the dispending pharmacy. This could possibly lead to a party illegally sending a schedule 8 drug held in the defective safe via the postal service to a technician able to retrieve the medication within the safe. The technician receiving the safe and medication invariably will not be legally permitted to receive and hold scheduled medication. Once the medication has been retrieved from the defective safe it will be illegal to return the medication via the postal service to the dispensing pharmacy. Further, retrieval of the drugs from the defective safe typically results in the destruction of the safe and the consequential cost implication

Object

It is an object of the present invention substantially to overcome or ameliorate one or more of the problems associated with existing pharmaceutical dispensers employed for dispensing daily dosages of medication or at least to provide a useful alternative.

SUMMARY

In a first aspect there is disclosed a dispenser including:

a base having a plurality of compartments to hold product;

a lid operatively associated with the base and adapted to be pivotally secured to the base, the lid including a lid opening which is adapted to be aligned with a single compartment of the base upon rotation of the lid so that a user is able to access product held within the single compartment; and a sub-lid assembly operatively adapted to control pivotal movement of the lid relative to the base, the sub-lid assembly including:

(i) a rotator operatively attached to the lid, the rotator including a locking formation and a re-setting formation;

(ii) a locking arm operatively associated with the locking formation, the locking arm movable between an arm locked position, in which the locking arm cooperates with the locking formation to deter rotation of the rotator, and an arm released position in which the locking arm permits rotation of the rotator; and (iii) an actuating lever operatively associated with the re-setting formation, the actuating lever being moveable between an actuator engaged position, in which the actuating lever secures the locking arm in the arm locked position, and an actuator disengaged position, in which the locking arm is permitted to move to the arm released position, and wherein rotation of the rotator causes the re-setting formation to engage the actuating lever so as to move the actuating lever from the actuator disengaged position to the actuator engaged position.

Preferably the lid includes a lid attachment formation and the base includes a base attachment formation operatively adapted to engage the lid attachment formation to secure the lid to the base while permitting pivotal movement of the lid relative to the base.

Preferably the lid attachment formation provides a lid bayonet formation which is operatively adapted to engage a complemental base bayonet formation of the base attachment formation.

Preferably the lid bayonet formation and the base bayonet formation are configured to define a lid release position in which the lid is adapted to be removed from the base.

Preferably the lid includes a gripping protrusion outwardly extending from an outer surface of the lid.

Preferably the gripping protrusion is located proximate the lid opening.

Preferably the locking arm includes a locking head which is operatively engaged by the actuating lever when the locking arm is located in the arm locked position and the actuating lever is located in the actuator engaged position.

Preferably the locking arm includes an arm recess which is operatively adapted to receive and hold a portion of the actuating lever when the locking arm is located in the arm released position and the actuating lever is located in the actuator disengaged position.

Preferably the locking arm includes biasing means to bias the locking arm to the arm released position.

Preferably the biasing means is a torsional spring.

Preferably the locking arm includes a locking flange which outwardly extends from an outer surface of the locking head, the locking flange operatively adapted to be engaged by a flange formation of the rotor so as to move the locking flange between a flange locked position and a flange released position.

Preferably (i) locating the locking flange in the flange locked position will cause the locking arm to be located in the arm locked position, and (ii) locating the locking flange in the flange released position will cause the locking arm to be located in the arm released position.

Preferably the actuating lever includes an actuating arm which outwardly extends from the actuating lever, the actuating arm operatively adapted to be engaged by the re-setting formation of the rotator so as to move the actuating arm between an actuating arm locked position and an actuating arm released position.

Preferably (i) locating the actuating arm in the actuating arm locked position will cause the actuating lever to be located in the actuator engaged position, and (ii) locating the actuating arm in the actuating arm released position will cause the actuating lever to be located in the actuator disengaged position.

Preferably the sub-lid assembly includes a first and second solenoid.

Preferably the first solenoid includes a first plunger and the second solenoid includes a second plunger.

Preferably the first plunger is moveable between a first extended position and a first retracted position.

Preferably the second plunger is movable between a second extended position and a second retracted position.

Preferably the actuating lever is located in the actuator engaged position when the first plunger is located in the first extended position and the second plunger is located in the second retracted position.

Preferably the actuating lever is located in the actuator disengaged position when the first plunger is located in the first retracted position and the second plunger is located in the second extended position.

Preferably the sub-lid assembly includes a sub-lid base operatively associated with the rotator.

Preferably the sub-lid base includes a base ratchet formation.

Preferably the sub-lid assembly includes a ratchet member which operatively engages the base ratchet formation and co-operates with the base ratchet formation to provide that the rotator is adapted to undergo rotation in one direction only.

Preferably the sub-lid assembly includes a ratchet spring adapted to maintain engagement between the ratchet member and the base ratchet formation.

Preferably the sub-lid assembly includes a controller operatively associated with the first and second solenoid.

Preferably the dispenser includes a communication assembly operatively associated with the controller and adapted to facilitate communication between the controller and a docking controller of a docking station.

Preferably the dispenser includes a cap removably attached to the sub-lid base.

Preferably the cap includes a cap seal adapted to be pierced with a piercing tool when it is required to remove the cap from the sub-lid base.

Preferably the sub-lid base includes a key opening though which a key is permitted to pass, the key operatively adapted to engage a key lever attached to the actuating lever in order to move the actuating lever from the actuator engage position to the actuator disengaged position.

In a second aspect there is disclosed a pharmaceutical dispenser including:

a base having a plurality of compartments to hold a prescribed pharmaceutical;

a lid operatively associated with the base and adapted to be pivotally secured to the base, the lid including a lid opening which is adapted to be aligned with a single compartment of the base upon rotation of the lid so that a user is able to access the prescribed pharmaceutical held within the single compartment; and a sub-lid assembly operatively adapted to control pivotal movement of the lid relative to the base, the sub-lid assembly including:

(i) a rotator operatively attached to the lid, the rotator including a locking formation and a re-setting formation;

(ii) a locking arm operatively associated with the locking formation, the locking arm movable between an arm locked position, in which the locking arm cooperates with the locking formation to deter rotation of the rotator, and an arm released position in which the locking arm permits rotation of the rotator; and (iii) an actuating lever operatively associated with the re-setting formation, the actuating lever being moveable between an actuator engaged position, in which the actuating lever secures the locking arm in the arm locked position, and an actuator disengaged position, in which the locking arm is permitted to move to the arm released position, and wherein rotation of the rotator causes the re-setting formation to engage the actuating lever so as to move the actuating lever from the actuator disengaged position to the actuator engaged position.

BRIEF DESCRIPTION OF THE DRAWINGS

Preferred embodiments of the invention will be described hereinafter, by way of examples only, with reference to the accompanying drawings, wherein.

DESCRIPTION OF PREFERRED EMBODIMENTS

Figure 1:
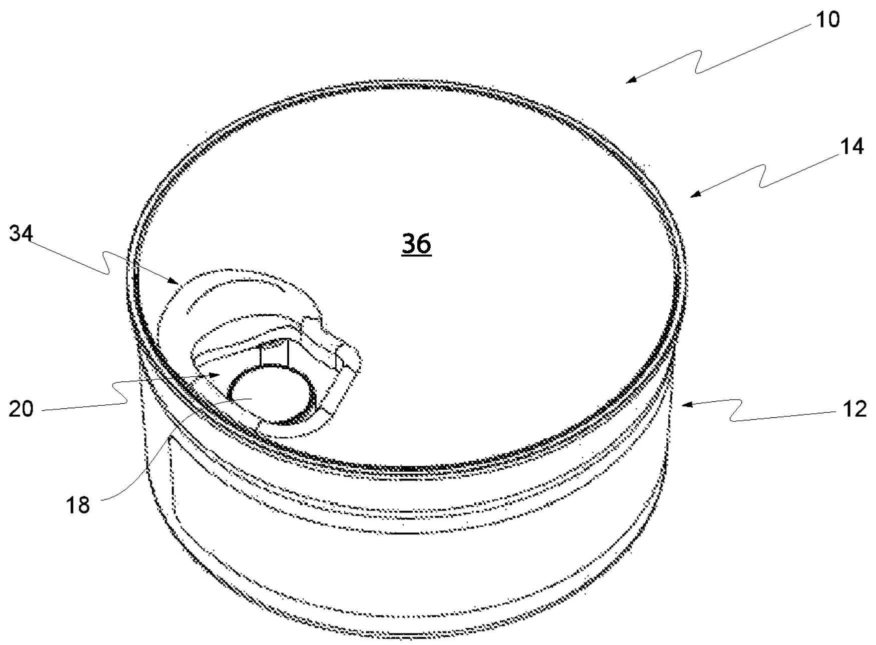
FIG. 1 is a perspective view of an embodiment dispenser, here specifically a pharmaceutical dispenser.
Figure 2:
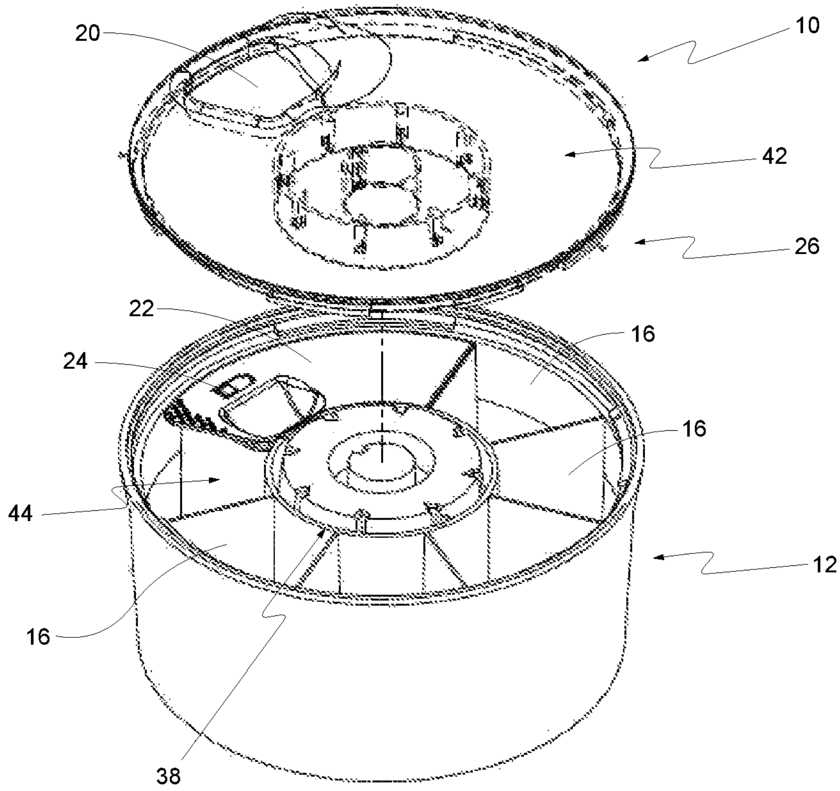
FIG. 2 is an exploded perspective view of the pharmaceutical dispenser of FIG. 1 showing a base and a lid.
Figure 3:
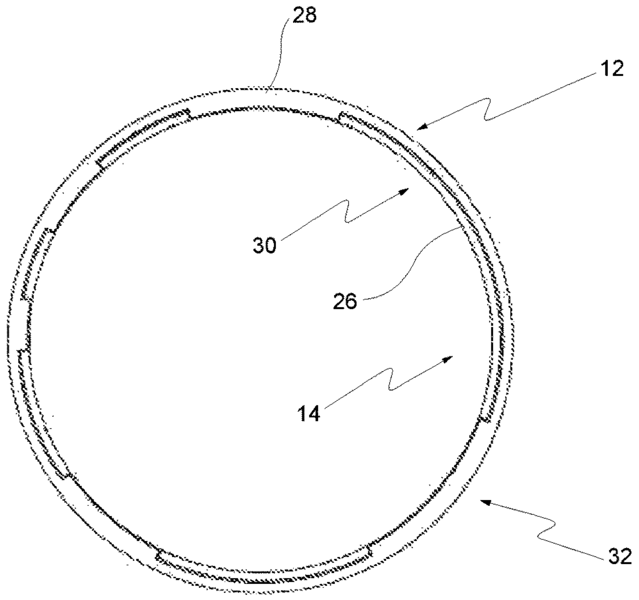
FIG. 3 is a diagrammatic representation of the base and lid of FIG. 2 in a lid release position.

In the description below a dispenser is provided for use as a pharmaceutical dispenser. It will of course be appreciated that the dispenser can found application in various industries where a dispenser with a programmable delivery system is required for dispensing/delivering product. The dispenser is accordingly not limited to the pharmaceutical application discussed below.

FIGS. 1 to 4 show an embodiment pharmaceutical dispenser, generally indicated with the reference numeral 10. The pharmaceutical dispenser 10 includes a (i) base 12 and (ii) a lid 14 operatively associated with the base 12 and adapted to be pivotally secured to the base 12. The base 14 has plurality of compartments 16 adapted to hold a prescribed pharmaceutical. In this embodiment the base 12 has eight compartments 16 which are sized to house 50 ml or 200 ml bottles 18 holding a prescribed medication, for example methadone.

The lid 14 includes a lid opening 20 which is adapted to be aligned with a single compartment 16 of the base 12 upon rotation of the lid 14. This configuration provides that a user patient is able to access the prescribed pharmaceutical held within a single compartment 16 only. A lid member 22 is operatively associated with the lid 14 and includes a lid member opening 24 which is in register with the lid opening 20. The lid member 22 is adapted to rotate with the lid 14 about the base 12 to provide access to a single compartment 16.

The lid 14 includes a lid attachment formation 26 and the base 12 includes a base attachment formation 28 operatively adapted to engage the lid attachment formation 26 to secure the lid 14 to the base 12 while permitting pivotal movement of the lid 14 relative to the base 12. In this embodiment the lid attachment formation 26 provides a lid bayonet formation 30 which is operatively adapted to engage a complemental base bayonet 32 formation of the base attachment formation 28. The lid bayonet formation 30 and the base bayonet formation 32 are configured to define a lid release position in which they co-operate so that the lid 14 is adapted to be removed from the base 12 as described below.

The lid 14 includes a gripping protrusion 34 outwardly extending from an outer surface 36 of the lid 14 and provides purchase to a finger of a user patient rotating the lid 14 relative to the base 12. The gripping protrusion 34 is located proximate the lid opening 20.

The pharmaceutical dispenser 10 includes a sub-lid assembly 38 operatively adapted to control pivotal movement of the lid 14 relative to the base 12. The sub-lid assembly 38 includes a rotator 40 operatively attached to the lid 14. To ensure the lid 14 is correctly orientated with the rotator 40 the lid 14 includes a lid keyway formation 42 which is operatively adapted to engage a complemental rotator keyway formation 44 of the rotator 40.

Referring also to FIGS. 5 to 8, the rotator 40 includes (i) a locking formation 46 operatively associated with a locking arm 48 of the sub-lid assembly 38, and (ii) a re-setting formation 50 operatively associated with an actuator lever 52. The locking formation 46 of the rotator 40 includes a plurality of outwardly extending locking ramps 54 while the re-setting formation 50 includes a plurality of operatively downwardly extending re-setting ramps 56.

Figure 5:
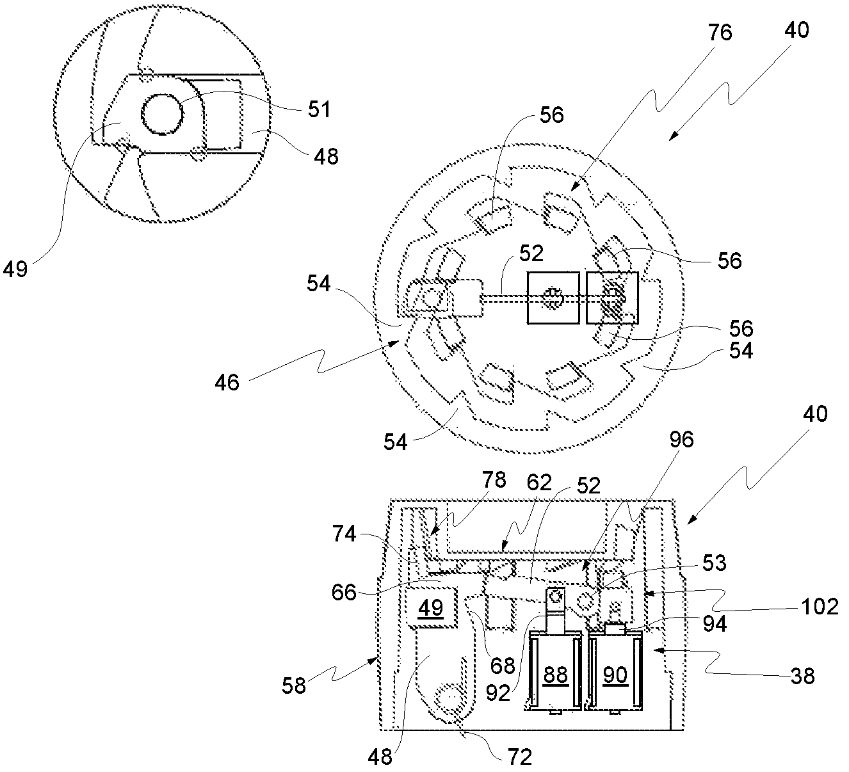
FIGS. 5 to 8 show various stages in rotating a rotator of the pharmaceutical dispenser of FIG. 1.
Figure 6:
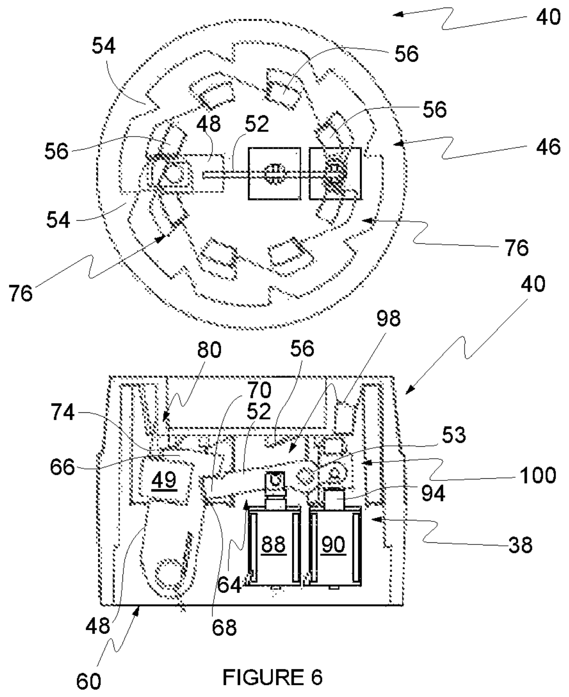

The locking arm 48 is movable between (i) an arm locked position 58, depicted in FIG. 5, in which the locking arm 48 cooperates with the locking formation 46 to deter rotation of the rotator 40, and (ii) an arm released position 60, depicted in FIG. 6, in which the locking arm 48 permits rotation of the rotator 40. Rotation of the rotator 40 permits rotation of the lid 14 so that the lid opening 20 is located in position above a compartment holding a bottle 18 filled with methadone. With the locking arm 48 located in the arm locked position 58 the patient user is unable to rotate the lid 14 to access a compartment 16 holding a bottled filled with methadone.

The actuating lever 52 is moveable between (i) an actuator engaged position 62 in which the actuating lever 52 secures the locking arm 48 in the arm locked position 58, and (ii) an actuator disengaged position 64, in which the locking arm 48 is permitted to move to the arm released position 60. It is pointed out that the actuating lever 52 is pivotally mounted to a pivot point 53 and will in use pivot/rock between the actuator engaged position 62 and the actuator disengaged position 64. It will be appreciated that by controlling the position of the actuating lever 52 it will be possible to control the position of the locking arm 48 and whether the lid 14 is permitted to undergo rotation to allow a patient user access to a compartment 16 holding a bottle filled with methadone.

Rotation of the lid 14 is effected by a user patient manually applying torque to thereto. Such torque applied by the patient user will have the effect also of rotating the rotator 40. Rotation of the rotator 40 will cause the re-setting formation 50 to engage the actuating lever 52 so as to move the actuating lever 52 from the actuator disengaged position 64, depicted in FIG. 7, to the actuator engaged position 62, depicted in FIG. 8.

Figure 4:
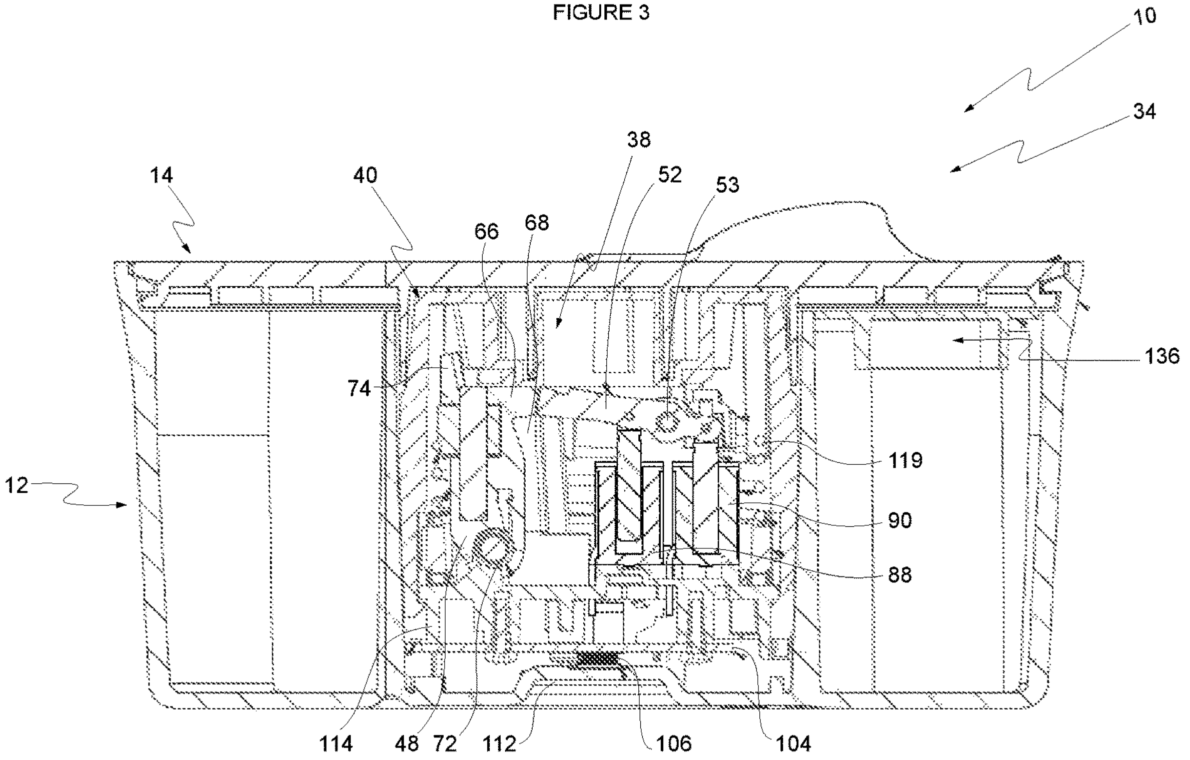
FIG. 4 is a cross-sectional view of the pharmaceutical dispenser of FIG. 1.

Referring to FIGS. 4 and 5, the locking arm 48 includes a locking head 66 which is operatively engaged by the actuating lever 52 when the locking arm 48 is located in the arm locked position 58 and the actuating lever 52 is located in the actuator engaged position 62. The locking arm 48 includes an arm recess 68 which is operatively adapted to receive and hold a portion 70 of the actuating lever 52 when the locking arm 48 is located in the arm released position 60 and the actuating lever 52 is located in the actuator disengaged position 64 shown in FIG. 6.

The locking arm 48 includes biasing means 72, here a torsion spring, to bias the locking arm 48 to the arm released position 60. The locking arm 48 further includes a locking flange 74 which outwardly extends from an outer surface of the locking head 66. The locking flange 74 is operatively adapted to be engaged by a flange formation 76 of the rotator 40 so as to move the locking flange 76 between a flange locked position 78, shown in FIG. 5, and a flange released position 80, shown in FIG. 6. Locating the locking flange 74 in the flange locked position 78 will cause the locking arm 48 to act against the torsion spring 72 to be located in the arm locked position 58, and locating the locking flange 74 in the flange released position 80 will cause the locking arm 48 to be located in the arm locked position 58. The locking arm 48 includes a contact member 49 for engaging the locking ramps 54 of the locking formation 46. The contact member 49 is pivotally mounted about an axle 51 to prevent a force applied to the lid 14 being transferred to the actuating lever 52 thereby to deter damage to the actuating lever 52 and preventing unauthorised access to a compartment 16.

Figure 7:
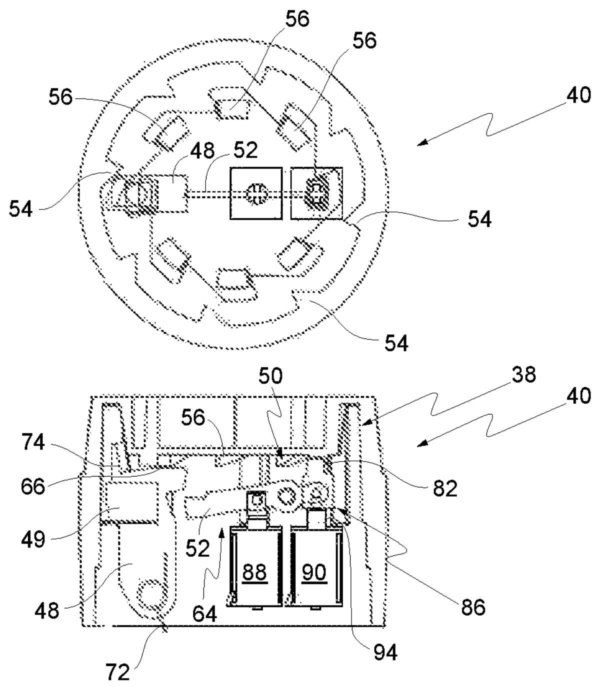
Figure 8:
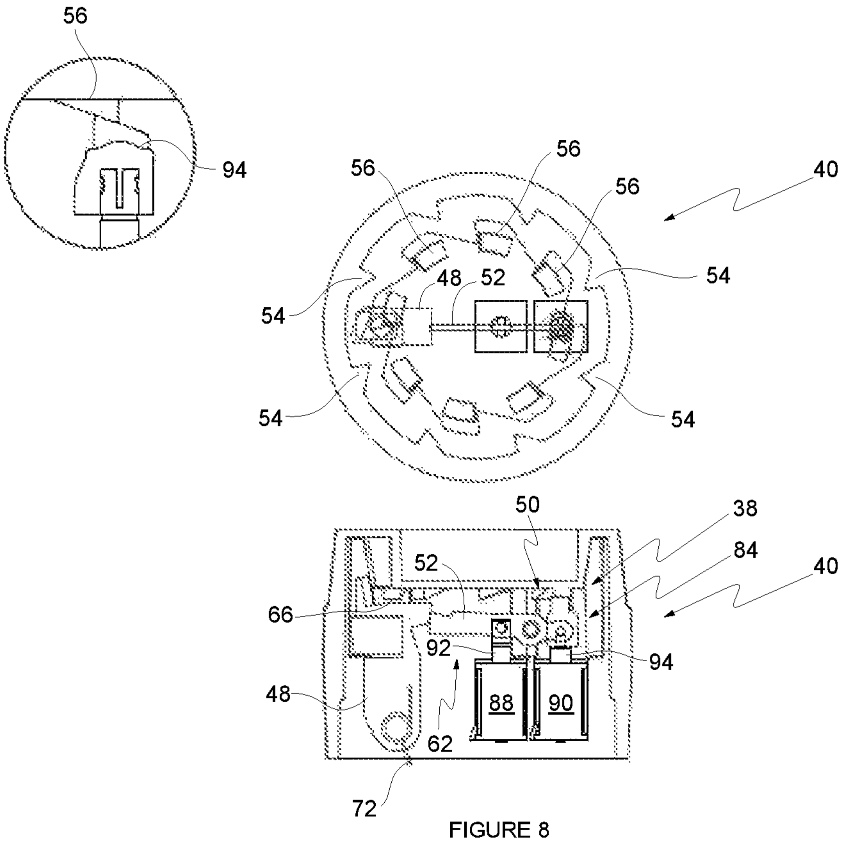

As shown in FIG. 7 the actuating lever 52 includes an actuating arm 82 which outwardly extends from the actuating lever 52. The actuating arm 82 is operatively adapted to be engaged by re-setting ramps 56 of the re-setting formation 50 of the rotator 40 so as to move the actuating arm 82 between an actuating arm locked position 84, shown in FIG. 8, and an actuating arm released position 86, shown in FIG. 7. Locating the actuating arm 82 in the actuating arm locked position 84 will cause the actuating lever 52 to pivot and be located in the actuator engaged position 62 while locating the actuating arm 82 in the actuating arm released position 86 will cause the actuating lever 52 to be located in the actuator disengaged position 64.

The sub-lid 38 assembly includes a first and second solenoid 88, 90. The first solenoid 88 includes a first plunger 92 and the second solenoid 90 includes a second plunger 94. The first plunger 92 is moveable between a first extended position 96, shown in FIG. 5, and a first retracted position 98, shown in FIG. 6, responsive to the first solenoid 88 being energised. The second plunger 94 is movable between a second extended position 100, shown in FIG. 6, and a second retracted position 102, shown in FIG. 5, responsive to the second solenoid being energised.

The actuating lever 52 is located in the actuator engaged position 62 when the first plunger 92 is located in the first extended position 96 and the second plunger 94 is located in the second retracted position 102. Conversely the actuating lever 52 is located in the actuator disengaged position 64 when the first plunger 92 is located in the first retracted position 98 and the second plunger 94 is located in the second extended position 100.

Referring to FIG. 4, the sub-lid assembly 38 includes a controller 104 in electronic communication with the first and second solenoid 88, 90. In this embodiment the controller 104 is provided in the form of a printed circuit board (PCB). The PCB 104 includes a non-illustrated timer which will determine when the first and second solenoids 88, 90 will be energised. When the first and second solenoids 88, 90 are energised they will co-operate to locate the actuating lever 52 in the actuator disengage position 64. The locking arm 48 will now under the influence of the biasing means/torsion spring 72 be located in the arm released position 60. This will allow a user to apply torque to the lid 14 to move the lid opening 20 a single position so that it is located in register with the next compartment 16 having a filled bottle of methadone. Such rotation of the lid 14 simultaneously causes (i) the locking flange 74 to be engaged by the flange formation 76 of the rotator 40 so as to move the locking flange 76 to the flange locked position 78 so that the locking arm 48 can be located in the arm locked position 58, (ii) the re-setting formation 50 engages the actuating arm 84 of the second plunger 94 of the second solenoid 90 so that the actuating lever 52 is returned to the actuator engaged position 62. No further rotation of the lid 14 is now possible until the timer causes the first and second solenoids 88, 90 to be energised to again permit rotation of the lid 14 by a user.

Figure 9:
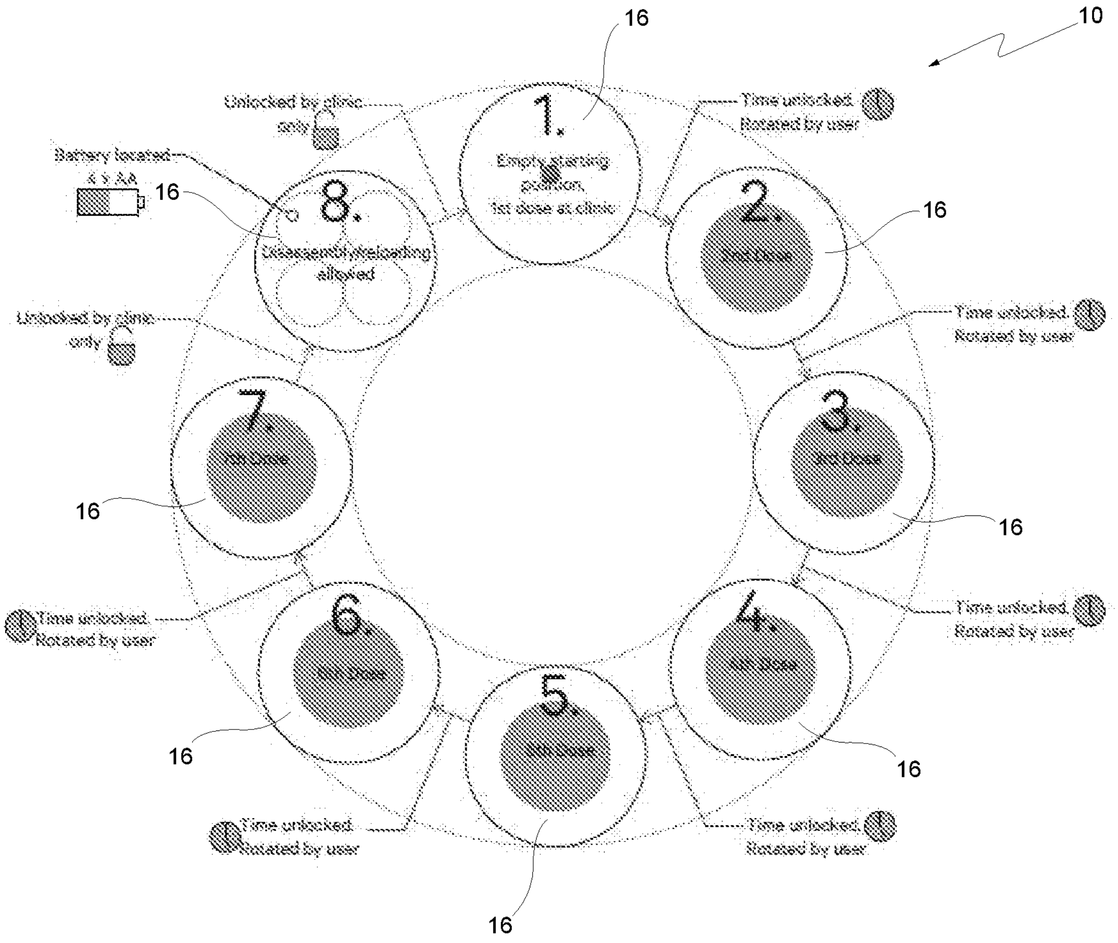
FIG. 9 shows a weekly cycle in using the pharmaceutical dispenser of FIG. 1 to dispense a pharmaceutical product.

FIG. 9 diagrammatically illustrates a weekly cycle of using the pharmaceutical dispenser 10 which has been replenished with 7 daily doses of methadone. For the first dose on day 1 the lid opening 20 is located in register with the first compartment 16 and the patient can take the first dose at the clinic in the presence of a pharmacist. Upon taking the first dose the patient may take the pharmaceutical dispenser 10 home with them. On day 2 the controller 104 will cause the first and second solenoids 88, 90 to be activated to locate the actuating lever 52 to be located in the actuator disengaged position 64 and causing the locking arm 48 to be located in the arm released position 60. This will typically occur at the same time each day, for example at 5 am. The patient may now rotate the lid 14 to gain access to the second dose only. The first and second solenoids 88, 90 will only be activated again on the following day to permit the patent to access the daily dose for the third day. This process will repeat until the seventh dose is taken. As mentioned above, the base 12 includes 8 compartments. The controller 104 will, however, only permit access to the patient to the seventh compartment. This is to deter a patient being able to remove the lid 14 to gain access to the sub-lid assembly 38 and tamper therewith.

Figure 17:
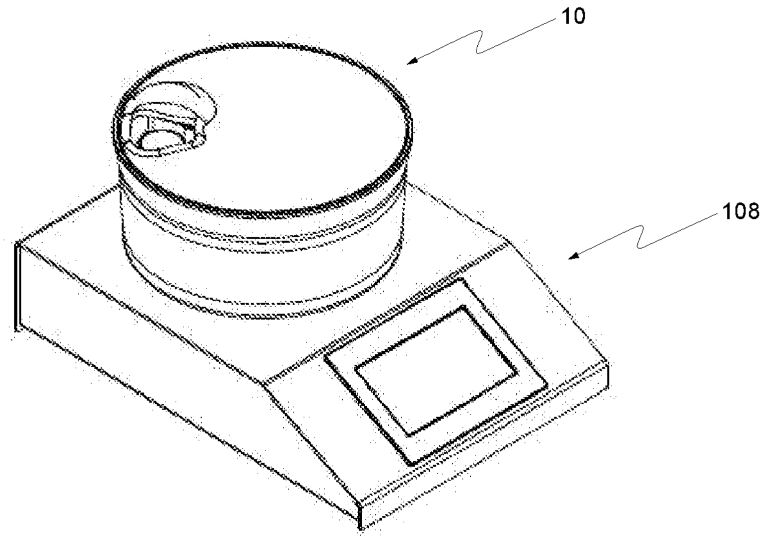
FIG. 17 shows the embodiment pharmaceutical dispenser of FIG. 1 mounted to a docking unit.
Figure 18:
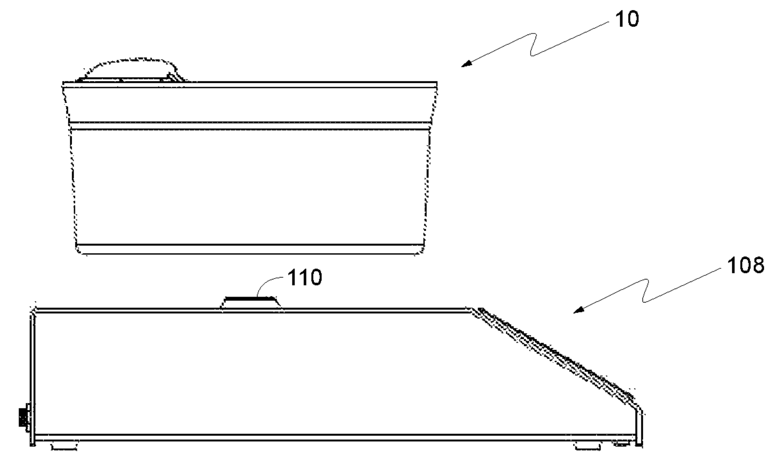
FIG. 18 shows the embodiment pharmaceutical dispenser of FIG. 1 located above the docking unit of FIG. 17.

The patient may now take the depleted pharmaceutical dispenser 10 to the clinic to be replenished. In this regard the sub-lid assembly 38 includes a communication coil 106, shown in FIG. 4, which will facilitate communication between the controller 104 and a docking station 108, shown in FIGS. 17 and 18. The docking station 108 incudes a communication connection 110 to facilitate communication between the docking station 108 and the controller 104 via the communication coil 106. The communication connection 110 is shaped to be received within a recess 112, shown in FIG. 4, in the base 12. Locating the lid opening 20 in register with the eighth compartment 16 will orientate the lid bayonet formation 30 relative to the base bayonet formation 32 so that the lid 14 is located in the lid release position permitting the lid 14 to be removed from the base 12. The clinic can now replenish the pharmaceutical dispenser 10 whereafter the above process is repeated.

Figure 15:
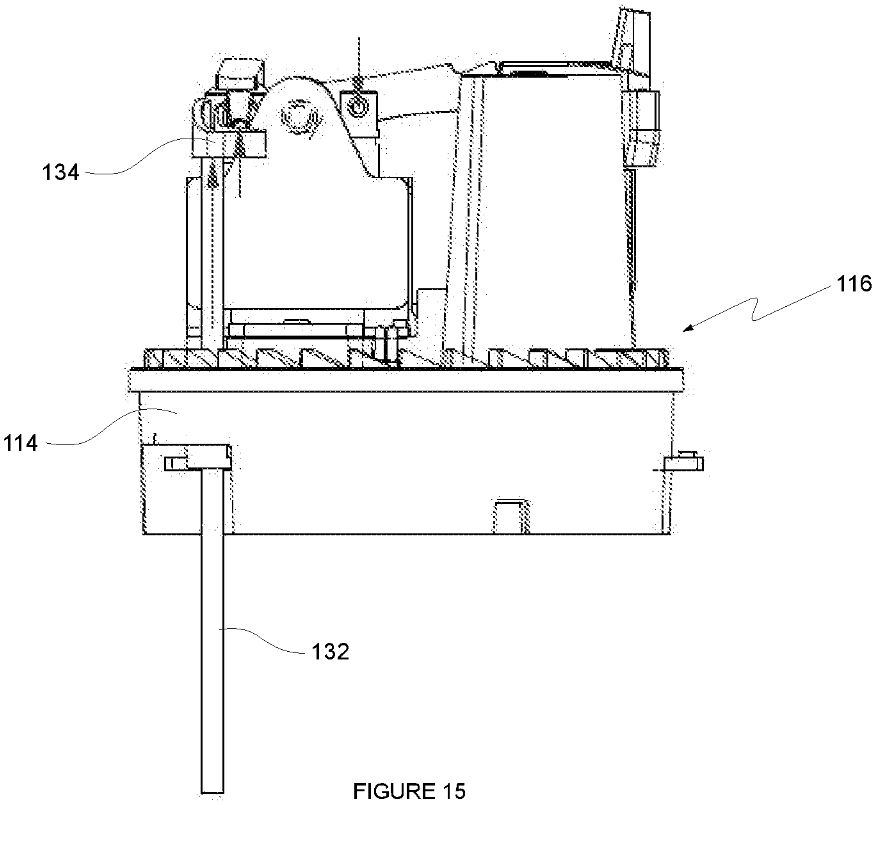
Figure 16:
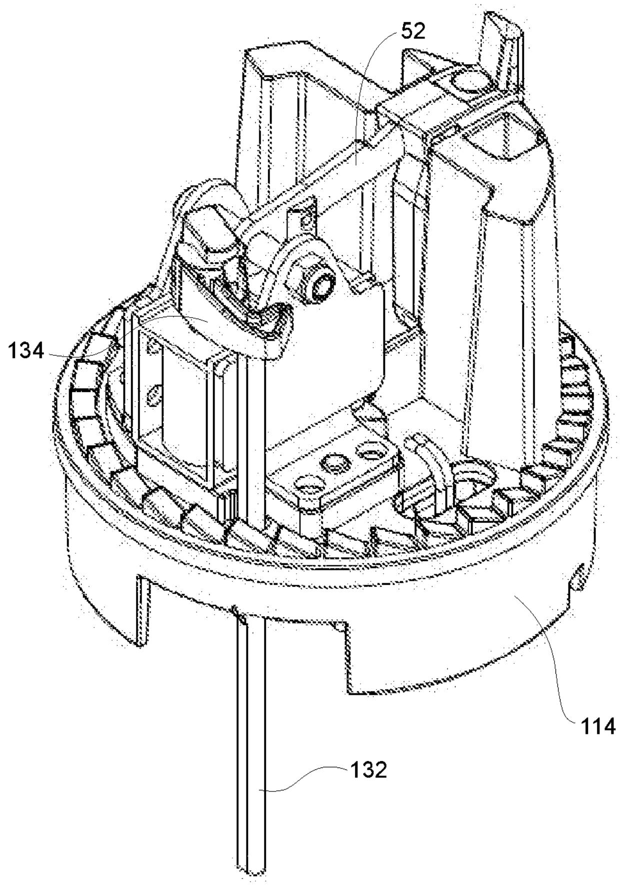

Referring to FIGS. 4 and 15 the sub-lid assembly 38 includes a sub-lid base 114 operatively associated with the rotator 40. The sub-lid base 114 includes a base ratchet formation 116. The sub-lid assembly 38 includes a ratchet member 118 which operatively engages the base ratchet formation 116 and co-operates with the base ratchet formation 116 to provide that the rotator 40 can undergo rotation in one direction only. The sub-lid assembly 38 includes a ratchet spring 119 adapted to maintain engagement between the ratchet member 118 and the base ratchet formation 116.

Figure 10:
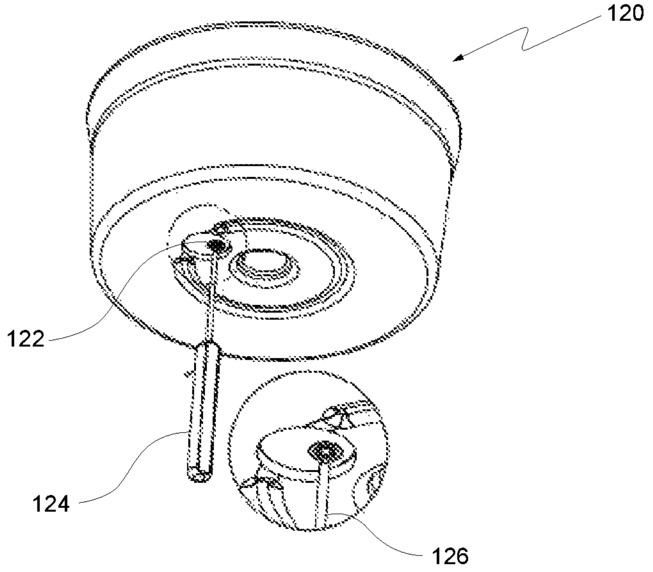
FIGS. 10 to 12 show steps in removing a sub-lid base from a sub-assembly of the pharmaceutical dispenser of FIG. 1.
Figure 11:
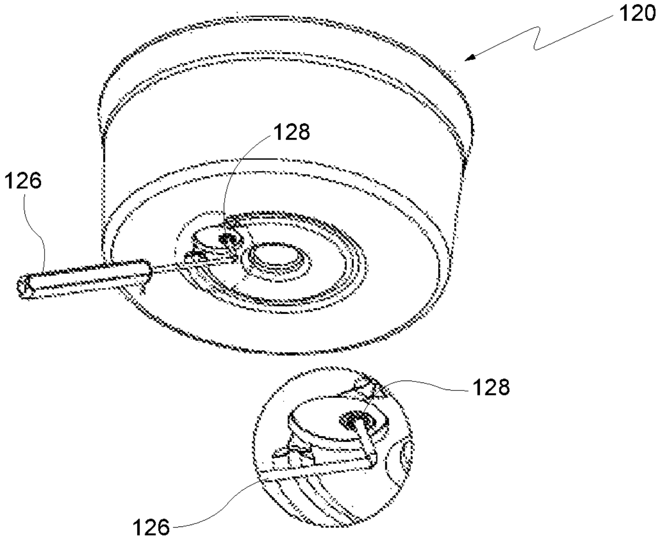
Figure 12:
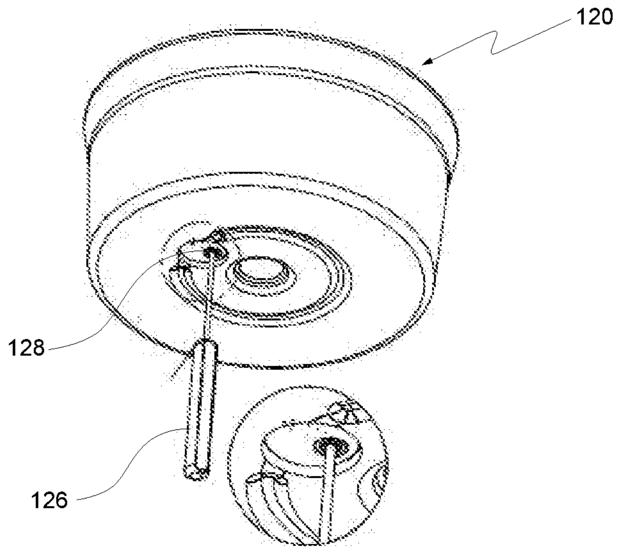
Figure 13:
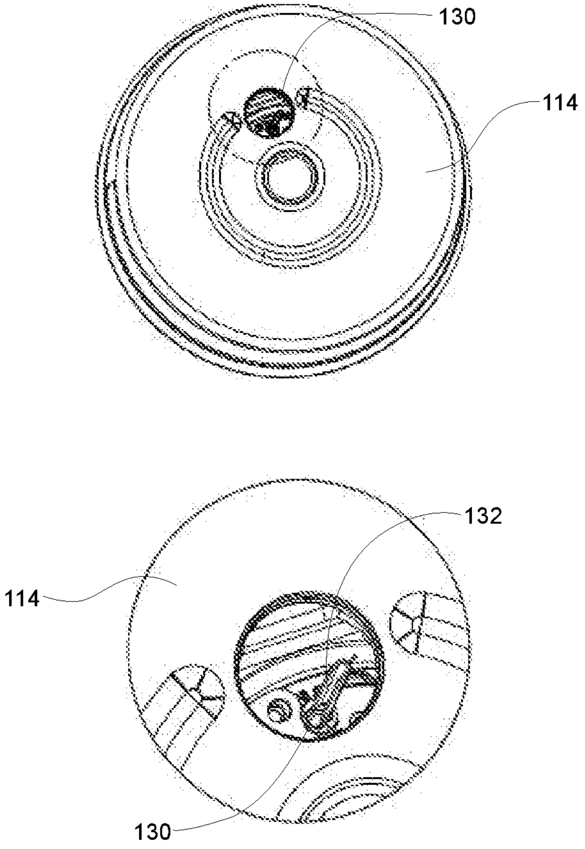
FIG. 13 to FIG. 16 show steps in manually actuating an actuating lever of an actuating lever of a sub-lid assembly of the pharmaceutical dispenser of FIG. 1.
Figure 14:
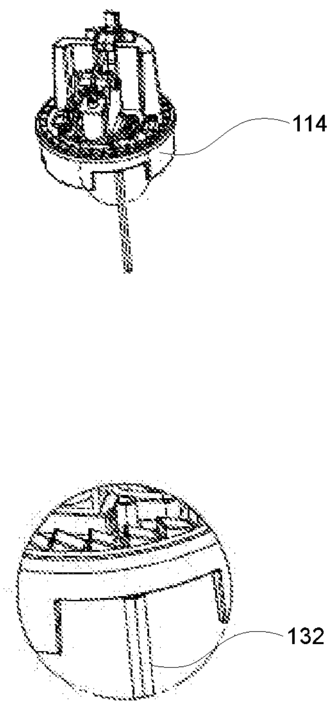

Should the pharmaceutical dispenser 10 become defective, for example due to a mechanical or electrical failure preventing a clinic to detach the lid 14 from the base 12, it is desirable that a manual override mechanism be provided. In this regard the pharmaceutical dispenser 10 includes a cap 120, shown in FIGS. 10 to 12, which is removably attached to the sub-lid base 114. The cap 120 includes a cap seal 122 which is adapted to be pierced with a piercing tool 124. If the cap seal 122 is broken other than by an authorised person such broken seal will evidence tampering with the pharmaceutical dispenser 10. The cap 120 is removed from the sub-lid base 114 by locating a hooking tool 126 within the opening 128, shown in FIG. 11, resulting from the cap seal 122 having been pierced. By reorienting the hooking tool 126 and by applying a downward force to the hooking tool 126 the cap 120 is removed from the sub-lid base 114.

Removing the cap 120 from the sub-lid base 114 exposes a key opening 130 though which a key 132 is permitted to pass. The key 132 is operatively adapted to engage a key lever 134 which is attached to the actuating lever 52. The key lever 134 is configured so that an upward force applied by the key 132 to the key lever 134 will move the actuating lever 52 from the actuator engage position 62, shown in FIG. 5, to the actuator disengaged position 64, shown in FIG. 6, such that the lid 14 can be rotated relative to the base 12.

Referring to FIG. 4, the lid 14 includes a battery housing 136 to store batteries for powering the controller 104.

Although the invention is described above in relation to preferred embodiments, it will be appreciated by those skilled in the art that it is not limited to those embodiments, but may be embodied in many other forms.

KEY TO REFERENCE NUMERALS

10 Pharmaceutical dispenser
12 Base
14 Lid
16 Compartments
18 Bottle
20 Lid opening
22 Lid member
24 Lid member opening

26 Lid attachment formation
28 Base attachment formation
30 Lid bayonet formation
32 Base bayonet formation
34 Gripping protrusion
36 Outer surface
38 Sub-lid assembly
40 Rotator
42 Lid keyway formation
44 Rotator keyway formation
46 Locking formation
48 Locking arm
49 Contact member
50 Re-setting formation
51 Axle
52 Actuating lever
53 Pivot point
54 Locking ramp
56 Re-setting ramps
58 Arm locked position
60 Arm released position
62 Actuator engaged position
64 Actuator disengaged position
66 Locking head
68 Arm recess
70 Portion of actuating lever 52
72 Biasing means
74 Locking flange
76 Flange formation
78 Flange locked position
80 Flange released position
82 Actuating arm
84 Actuating arm locked position
86 Actuating arm released position
88 First solenoid
90 Second solenoid
92 First plunger
94 Second plunger
96 First extended position
98 First retracted position
100 Second extended position
102 Second retracted position
104 Controller
106 Communication coil
108 Docking station
110 Communication connection
112 Recess
114 Sub-lid base
116 Base ratchet formation
118 Ratchet member
119 Ratchet spring
120 Cap
122 Cap seal
124 Piercing tool
126 Hooking tool
128 Opening
130 Key opening
132 Key
134 Key lever
136 Battery housing

The invention claimed is:

1. A dispenser including:

a base having a plurality of compartments to hold product;

a lid operatively associated with the base and adapted to be secured to the base, while permitting rotational movement of the lid relative to the base, the lid including a lid opening which is adapted to be aligned with a single compartment of the base upon rotation of the lid so that a user is able to access product held within the single compartment; and a sub-lid assembly operatively adapted to control rotational movement of the lid relative to the base, the sub-lid assembly including:

(i) a rotator operatively attached to the lid, the rotator including a locking formation and a re-setting formation, wherein the re-setting formation comprises a plurality of resetting ramps;

(ii) a locking arm operatively associated with the locking formation, the locking arm movable between an arm locked position, in which the locking arm cooperates with the locking formation to deter rotation of the rotator, and an arm released position in which the locking arm permits rotation of the rotator;

(iii) an actuating lever operatively associated with the re-setting formation, the actuating lever being moveable between an actuator engaged position, in which the actuating lever secures the locking arm in the arm locked position, and an actuator disengaged position, in which the locking arm is permitted to move to the arm released position, and (iv) a first and second solenoid, the first solenoid including a first connecting member and the second solenoid including a second connecting member, wherein the first connecting member is moveable between a first extended position and a first retracted position responsive to the first solenoid being energized and the second connecting member is movable between a second extended position and a second retracted position responsive to the second solenoid being energized, wherein (a) the actuating lever is located in the actuator engaged position when the first connecting member is located in the first extended position and the second connecting member is located in the second retracted position, and (b) the actuating lever is located in the actuator disengaged position when the first connecting member is located in the first retracted position and the second connecting member is located in the second extended position, and wherein rotation of the of the lid by the user causes the re-setting formation to engage the actuating lever so as to move the actuating lever from the actuator disengaged position to the actuator engaged position.

2. A dispenser according to claim 1, wherein the lid includes a lid attachment formation and the base includes a base attachment formation operatively adapted to engage the lid attachment formation to secure the lid to the base while permitting rotational movement of the lid relative to the base.

3. A dispenser according to claim 2, wherein the lid attachment formation provides a lid bayonet formation which is operatively adapted to engage a complemental base bayonet formation of the base attachment formation.

4. A dispenser according to claim 3, wherein the lid bayonet formation and the base bayonet formation are configured to define a lid release position in which the lid is adapted to be removed from the base.

5. A dispenser according to claim 4, wherein the lid includes a gripping protrusion outwardly extending from an outer surface of the lid.

6. A dispenser according to claim 5, wherein the gripping protrusion is located proximate the lid opening.

7. A dispenser according to claim 6, wherein the locking arm includes a locking head which is operatively engaged by the actuating lever when the locking arm is located in the arm locked position and the actuating lever is located in the actuator engaged position.

8. A dispenser according to claim 7, wherein the locking arm includes an arm recess which is operatively adapted to receive and hold a portion of the actuating lever when the locking arm is located in the arm released position and the actuating lever is located in the actuator disengaged position.

9. A dispenser according to claim 8, wherein the locking arm includes biasing means to bias the locking arm to the arm released position.

10. A dispenser according to claim 9, wherein the biasing means is a torsional spring.

11. A dispenser according to claim 9, wherein the locking arm includes a locking flange which outwardly extends from an outer surface of the locking head, the locking flange operatively adapted to be engaged by a flange formation of the rotator so as to move the locking flange between a flange locked position and a flange released position.

12. A dispenser according to claim 11, wherein the dispenser is adapted such that (i) locating the locking flange in the flange locked position will cause the locking arm to be located in the arm locked position, and (ii) locating the locking flange in the flange released position will cause the locking arm to be located in the arm released position.

13. A dispenser according to claim 12, wherein the actuating lever includes an actuating arm which outwardly extends from the actuating lever, the actuating arm operatively adapted to be engaged by the re-setting formation of the rotator so as to move the actuating arm between an actuating arm locked position and an actuating arm released position.

14. A dispenser according to claim 13, wherein the dispenser is adapted such that (i) locating the actuating arm in the actuating arm locked position will cause the actuating lever to be located in the actuator engaged position, and (ii) locating the actuating arm in the actuating arm released position will cause the actuating lever to be located in the actuator disengaged position.

15. A dispenser according to claim 14, further comprising a cap removably attached to the sub-lid base;

wherein the sub-lid assembly includes a sub-lid base operatively associated with the rotator;

wherein the sub-lid base includes a base ratchet formation and the sub-lid assembly includes a ratchet member which operatively engages the base rachet formation and co-operates with the base ratchet formation to provide that the rotator is adapted to undergo rotation in one direction only;

wherein the sub-lid assembly includes a ratchet spring adapted to maintain engagement between the ratchet member and the base ratchet formation;

wherein the sub-lid assembly includes (i) a controller operatively associated with the first and second solenoid, and (ii) a communication assembly operatively associated with the controller and adapted to facilitate communication between the controller and a docking controller of a docking station;

wherein the cap includes a cap seal adapted to be pierced with a piercing tool when it is required to remove the cap from the sub-lid base; and wherein the sub-lid base includes a key opening though which a key is permitted to pass, the key operatively adapted to engage a key lever attached to the actuating lever in order to move the actuating lever from the actuator engaged position to the actuator disengaged position.

16. A pharmaceutical dispenser including:

a base having a plurality of compartments to hold a prescribed pharmaceutical;

a lid operatively associated with the base and adapted to be secured to the base while permitting rotational movement of the lid relative to the base, the lid including a lid opening which is adapted to be aligned with a single compartment of the base upon rotation of the lid so that a user is able to access the prescribed pharmaceutical held within the single compartment; and a sub-lid assembly operatively adapted to control rotational movement of the lid relative to the base, the sub-lid assembly including:

(i) a rotator operatively attached to the lid, the rotator including a locking formation and a re-setting formation, wherein the re-setting formation comprises a plurality of resetting ramps;

(ii) a locking arm operatively associated with the locking formation, the locking arm movable between an arm locked position, in which the locking arm cooperates with the locking formation to deter rotation of the rotator, and an arm released position in which the locking arm permits rotation of the rotator;

(iii) an actuating lever operatively associated with the re-setting formation, the actuating lever being moveable between an actuator engaged position, in which the actuating lever secures the locking arm in the arm locked position, and an actuator disengaged position, in which the locking arm is permitted to move to the arm released position, and (iv) a first and second solenoid, the first solenoid including a first connecting member and the second solenoid including a second connecting member, wherein the first connecting member is moveable between a first extended position and a first retracted position responsive to the first solenoid being energized and the second connecting member is movable between a second extended position and a second retracted position responsive to the second solenoid being energized, wherein (a) the actuating lever is located in the actuator engaged position when the first connecting member is located in the first extended position and the second connecting member is located in the second retracted position, and (b) the actuating lever is located in the actuator disengaged position when the first connecting member is located in the first retracted position and the second connecting member is located in the second extended position, and wherein rotation of the of the lid by the user causes the re-setting formation to engage the actuating lever so as to move the actuating lever from the actuator disengaged position to the actuator engaged position.

* * * * *